Figure 1:
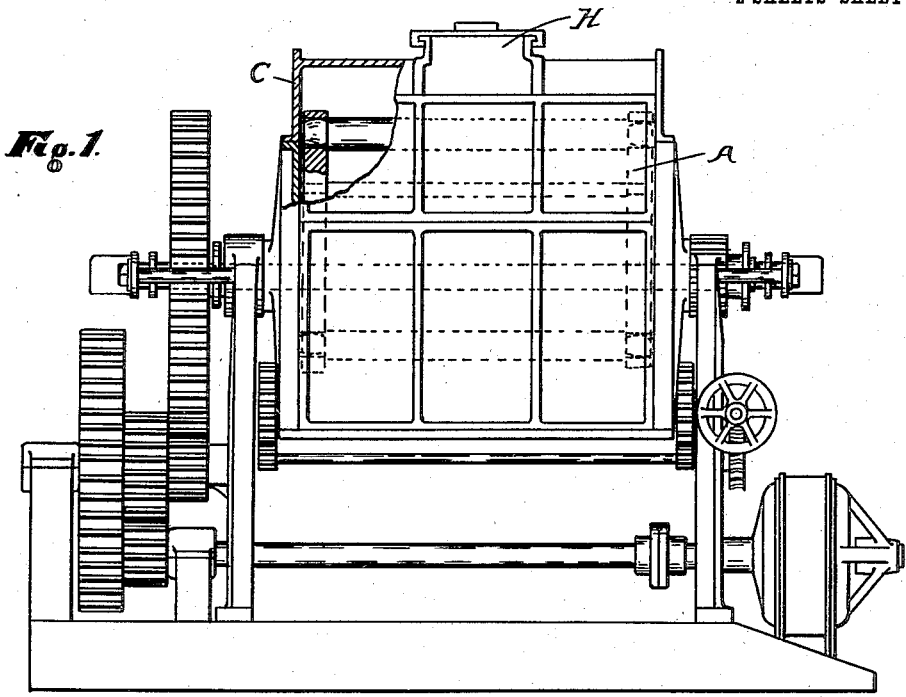

J. C. GORDON.
METHOD OF MIXING DOUGH.
APPLICATION FILED JULY 2, 1912.

1,134,329.

Patented Apr. 6, 1915.
2 SHEETS—SHEET 1.

Witnesses
W. S. Ford
James P. Barry

Inventor
James C. Gordon
By Whittemore Hulbert & Whittemore
Attys

J. C. GORDON.
METHOD OF MIXING DOUGH.
APPLICATION FILED JULY 2, 1912.

1,134,329.

Patented Apr. 6, 1915.
2 SHEETS—SHEET 2.

WITNESSES:

INVENTOR
James C. Gordon
BY
ATTORNEY

UNITED STATES PATENT OFFICE.

JAMES C. GORDON, OF DETROIT, MICHIGAN.

METHOD OF MIXING DOUGH.

1,134,329.  Specification of Letters Patent.  Patented Apr. 6, 1915.

Application filed July 2, 1912. Serial No. 707,228.

*To all whom it may concern:*

Be it known that I, JAMES C. GORDON, a citizen of the United States of America, residing at Detroit, in the county of Wayne and State of Michigan, have invented certain new and useful Improvements in Methods of Mixing Dough, of which the following is a specification, reference being had therein to the accompanying drawings.

The invention relates to dough mixing processes and consists in the novel method of manipulating the plastic mass as hereinafter set forth.

In the present state of the art it is common to mix dough by various forms of stirring and beating mechanisms, and it is also old to mix by shredding or tearing apart portions of the plastic mass. I have discovered that a better product can be obtained in a shorter space of time and with less expenditure of power by a rolling action upon the plastic mass and by avoiding the cutting, shredding or tearing apart of the dough. As showing the advantages of my improved process, comparative tests between some of the most approved processes heretofore employed have been carried on daily for a number of months, showing the following results: Dough mixed by the shredding process in thousand-pound batches—time required for mixing and beating, twenty-four minutes; dough composed of the same ingredients, and mixed by my improved process in thousand-pound batches—time required for manipulation, twelve minutes; character of product of this process—the dough whiter and better than by the former process.

In carrying out my improved process I preferably employ a cylindrical container, having a practically continuous surface over which the dough mass is rolled. Within the cylinder is a revoluble member carrying a plurality of independently revoluble rolls which travel around through an orbit, substantially parallel to the surface of the cylinder, through the greater part of the circumference of the latter. The rolls are, however, spaced from the surface of the cylinder so as to provide room for the mass of dough therebetween; while at one point in the circumference, preferably at the bottom, there is a flattened or inwardly extending portion, which closely approaches the path of the rolls.

The apparatus just described is diagrammatically illustrated in the drawings, in which—

Figure 2:
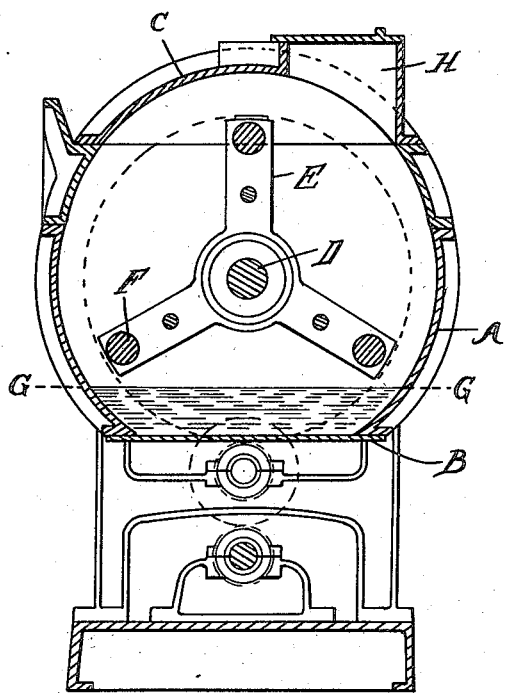
Figure 3:
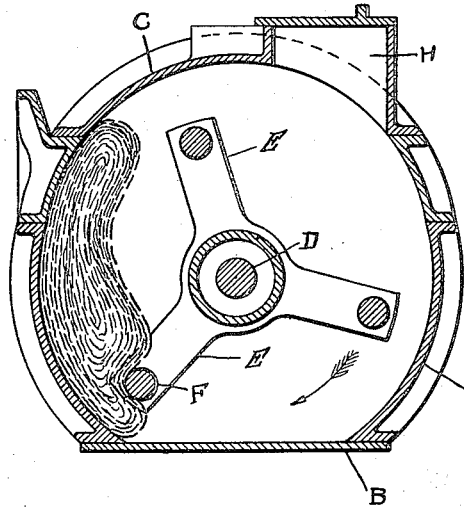
Figure 4:
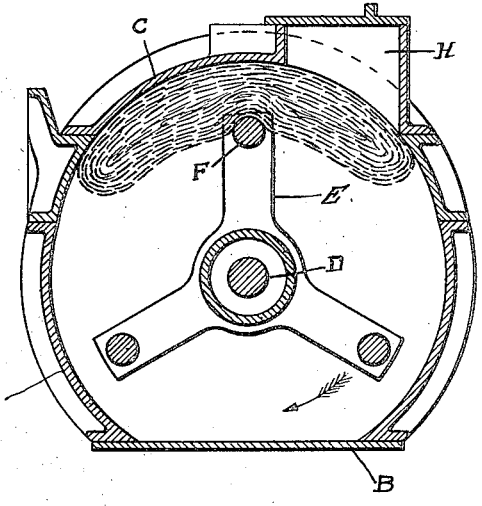
Figure 5:
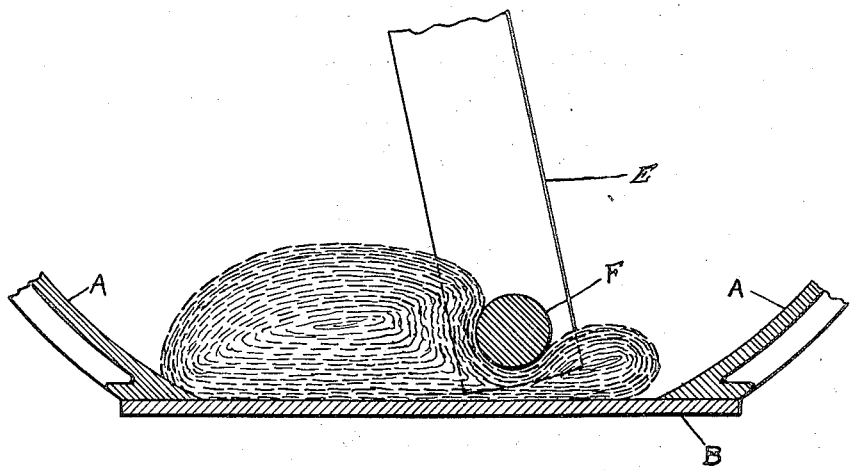

Figure 1 is a side elevation of the machine, and Fig. 2 is a cross section showing the apparatus after the materials for mixing the dough are first introduced; and Figs. 3, 4, and 5 indicate the manipulating action of the rolls upon the dough.

A is a cylindrical receptacle which at the bottom is provided with a flattened portion B. The top of the cylinder has a hinged portion C, which however is of segmental shape, forming a continuation of the circumference.

D is a rotary shaft passing through the axis of the drum, and carrying arms E, in which are journaled rolls F. These rolls are so positioned as to be spaced from the segmental portion of the cylinder and to just clear the center of the flattened portion B. There are preferably only three of the rolls which are distributed at equal angles about the axis of the cylinder.

In mixing the dough the ingredients are first introduced and occupy the bottom portion of the receptacle, as indicated below the line G—G. Motion is then imparted to the rotary shaft D, which carries around the arms E and rollers F. The latter will first operate as mixers for the fluid and dry ingredients, but as soon as a plastic mass is formed their action is to roll the mass over the cylindrical surface of the receptacle. The fact that the rolls are free to independently turn, permits them to squeeze and roll the plastic mass without shredding or tearing it, and the avoidance of this shredding or tearing action I believe to be one reason for the superiority of the product obtained.

While I do not fully understand the precise action of the rolls upon the plastic mass, or the reason why the operation is completed in the shorter time interval, I believe that the continuous rolling instead of an interrupted rolling action is important. It is also important that the rolls should be independently revoluble, while the flattened or inwardly projecting portion of the cylinder causes a manipulation of the dough which would not be obtained if all portions of the surface were equidistant from the rolls.

It will be appreciated that the present process is to be distinguished from such processes wherein a considerable quantity of material is placed in a container and subjected to the action of breaking, shredding, etc. In carrying out the present process a limited quantity of material, after assuming mass formation, is applied to the treating surface of considerably greater area than the mass, and the mass is subjected to pressure progressively from one end of the batch to the other, and by the applied pressure, the mass is caused to bodily move over the surface without shredding or breaking the mass. The rolls in operation may be described as having a sweeping kneading pressure on the mass, tending to move the same in the general direction of the applied pressure.

While the surface of the cylinder is practically continuous, a small portion of the cylinder is cut away to form an observation opening H. This however does not materially affect the continuity of the rolling surface.

What I claim as my invention is:

1. The art of kneading dough consisting in applying to a surface a batch of dough in mass formation, and of a length less than that of such surface, and applying successive rolling pressures to the mass progressively from one end of the batch to the other and by the applied pressure causing the mass to bodily move over the surface without shredding or breaking up the mass.

2. The method of manipulating dough, which consists in rolling and advancing the plastic mass as a unit over and in contact with a substantially uninterrupted endless surface, applying varying pressure to the mass during said rolling, and allowing the mass to expand without limitation at certain points in the movement over said surface.

3. The method of manipulating dough consisting in continuously rolling a mass of material over a surface subjecting the mass to periodically varying pressure, and allowing the material to have unlimited expansion at certain parts of its travel.

4. The method of manipulating dough consisting in applying separate rolling pressures to the mass over a resisting surface, while subjecting the mass to substantially uniform pressure for the greater portion of its movement, and to an increased pressure for a relatively smaller but extended interval, and permitting the mass to expand at intervals during the rolling movement thereof.

5. The method of manipulating dough consisting in subjecting the plastic mass to independent roller pressure over a smooth surface, maintaining the mass in continuous contact with said surface, and periodically varying the pressure applied to the mass.

6. The method of manipulating dough consisting in continuously subjecting the plastic mass to independent roller pressure over a smooth surface, maintaining the mass in continuous contact with said surface, and periodically applying pressure to the mass, the pressure being increased at intervals without breaking or shredding the mass.

7. The method of manipulating dough consisting in continuously advancing the mass over a continuous smooth surface and periodically applying different degrees of pressure to different portions of the mass without breaking or shredding the same, the mass being permitted to expand without restriction during parts of its travel over said surface.

8. The process of treating dough which consists in applying a sweeping roller kneading pressure to a mass of dough and causing the mass to move in the general direction of the applied pressure while maintaining the dough in unbroken mass formation.

9. The method of treating dough which consists in placing a batch of dough on a smooth curved surface, with an extended relatively flat portion causing the mass to move over the surface by applying roller pressure thereto in the same direction of the movement thereof, and maintaining the batch in mass formation.

In testimony whereof I affix my signature in presence of two witnesses.

JAMES C. GORDON.

Witnesses:
JAMES P. BARRY,
H. E. BOWMAN.